US011470384B2

United States Patent
Lv et al.

(10) Patent No.: US 11,470,384 B2
(45) Date of Patent: Oct. 11, 2022

(54) DATA PROCESSING METHOD AND APPARATUS, ELECTRONIC DEVICE, SYSTEM, AND STORAGE MEDIUM

(71) Applicant: Hangzhou Hikvision Digital Technology Co., Ltd., Zhejiang (CN)

(72) Inventors: Gang Lv, Zhejiang (CN); Xiangqing Jin, Zhejiang (CN); Zhuzhen Tang, Zhejiang (CN); Zhongjian Feng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/253,972

(22) PCT Filed: Jun. 13, 2019

(86) PCT No.: PCT/CN2019/091094
§ 371 (c)(1),
(2) Date: Dec. 18, 2020

(87) PCT Pub. No.: WO2019/242559
PCT Pub. Date: Dec. 26, 2019

(65) Prior Publication Data
US 2021/0274246 A1    Sep. 2, 2021

(30) Foreign Application Priority Data

Jun. 20, 2018  (CN) .......................... 201810638973.6

(51) Int. Cl.
*H04N 21/44* (2011.01)
*H04N 21/4402* (2011.01)
*H04N 21/4782* (2011.01)

(52) U.S. Cl.
CPC . *H04N 21/44008* (2013.01); *H04N 21/44004* (2013.01); *H04N 21/440281* (2013.01); *H04N 21/4782* (2013.01)

(58) Field of Classification Search
None
See application file for complete search history.

(56) References Cited

U.S. PATENT DOCUMENTS

2017/0289214 A1* 10/2017 Cho .................... H04L 65/4015
2018/0027264 A1*  1/2018 Cheung ............ H04N 21/23103
725/115

(Continued)

FOREIGN PATENT DOCUMENTS

CN   102111674 A    6/2011
CN   106790132 A    5/2017
(Continued)

*Primary Examiner* — Heather R Jones
(74) *Attorney, Agent, or Firm* — Bret E. Field; Bozicevic, Field & Francis LLP (57) ABSTRACT

A data processing method and apparatus, and an electronic device, a system and a storage medium are provided. The method is applicable to a main thread in a Web client and includes: obtaining audio and video data of a target video from a server decapsulating the obtained audio and video data to obtain first audio and video data; sending the first audio and video data to a target sub-thread in the Web client, so that the target sub-thread decodes the first audio and video data to obtain second audio and video data and sends the second audio and video data to the main thread; receiving the second audio and video data sent by the target sub-thread; and rendering video data in the second audio and video data by using a rendering module of a browser of the Web client, and taking the rendered video data and audio data in the second audio and video data as to-be-played data for the target video. The technical solution according to the (Continued)

embodiment of the present application allows a Web client to play audio and video data without browser plug-ins.

19 Claims, 3 Drawing Sheets

(56) References Cited

U.S. PATENT DOCUMENTS

| | | |
|---|---|---|
| 2018/0103261 A1 | 4/2018 | Sun et al. |
| 2018/0131741 A1 | 5/2018 | Song et al. |
| 2019/0020915 A1* | 1/2019 | Stockhammer ..... H04L 67/2804 |

FOREIGN PATENT DOCUMENTS

| | | |
|---|---|---|
| CN | 107277612 A | 10/2017 |
| CN | 107483972 A | 12/2017 |
| CN | 108076364 A | 5/2018 |
| WO | WO2010034226 A1 | 4/2010 |
| WO | 2018067294 A1 | 4/2018 |

* cited by examiner

Fig. 5

DATA PROCESSING METHOD AND APPARATUS, ELECTRONIC DEVICE, SYSTEM, AND STORAGE MEDIUM

The present application claims the priority to a Chinese patent application No. 201810638973.6, filed with the China National Intellectual Property Administration on Jun. 20, 2018 and entitled "DATA PROCESSING METHOD AND APPARATUS, ELECTRONIC DEVICE, SYSTEM AND STORAGE MEDIUM", which is incorporated herein by reference in its entirety.

TECHNICAL FIELD

The application relates to the field of data processing technology, in particular to a data processing method and apparatus, and an electronic device, a system, and a storage medium.

BACKGROUND

With the networking of audio and video, a user can enjoy audio and video through a Web client in a browser. In prior art, a Web client decodes and renders audio and video data by invoking certain plug-ins installed in a browser, so as to obtain the audio and video data to be played.

For example, the browser may be installed with an ActiveX/NPAPI plug-in. After receiving audio and video data from a server, the web client decapsulates the received audio and video data, invokes a decoding library and a rendering library through the Active X/NPAPI plug-in to decode and render the decapsulated audio and video data to obtain audio and video data to be played; and then plays the obtained audio and video data.

However, in some cases, plug-ins for audio and video playing may be prohibited from a browser. Therefore, how to allow a browser to play audio and video data without plug-ins is a pressing problem to be solved.

SUMMARY

Embodiments of the present application aim to provide a data processing method and apparatus, and an electronic device, a system, and a storage medium. A Web client is enabled to play audio and video data without browser plug-in. The following aspects are disclosed In a first aspect, an embodiment of the present invention provides a data processing method, applicable to a main thread in a Web client and including:

obtaining audio and video data of a target video from a server;

decapsulating the obtained audio and video data to obtain first audio and video data;

sending the first audio and video data to a target sub-thread in the Web client, so that the target sub-thread decodes the first audio and video data to obtain second audio and video data and sends the second audio and video data to the main thread;

receiving the second audio and video data sent by the target sub-thread; and rendering video data in the second audio and video data by using a rendering module of a browser of the Web client, and taking the rendered video data and audio data in the second audio and video data as to-be-played data for the target video.

Optionally, the Web client is in communication connection with the server via WebSocket protocol;

obtaining audio and video data of a target video from a server includes:

invoking a WebSocket callback function to obtain the audio and video data of the target video from the server.

Optionally, decapsulating the obtained audio and video data to obtain first audio and video data includes:

decapsulating, by Javascript/WASM, the obtained audio and video data to obtain the first audio and video data.

Optionally, the target sub-thread decoding the first audio and video data to obtain second audio and video data includes:

the target sub-thread decoding, by Javascript/WASM, the first audio and video data to obtain the second audio and video data.

Optionally, rendering video data in the second audio and video data by using a rendering module of a browser of the Web client includes:

invoking the rendering module of the browser of the Web client to render the video data in the second audio and video data;

or, sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

Optionally, the method further includes:

detecting a data amount of target audio and video data and/or a data amount of a target video data in real time; wherein the target audio and video data is undecoded audio and video data in the first audio and video data received by the target sub-thread in the Web client; and the target video data is unrendered video data in the second audio and video data;

if the data amount of the target audio and video data is detected to be larger than a first preset data amount, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client;

if the data amount of the target video data is detected to be larger than a second preset data amount, sending a second instruction to the server; so that the server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Optionally, the target audio and video data forms a decoding buffer queue, and the target video data forms a rendering buffer queue;

detecting a data amount of target audio and video data and/or a data amount of target video data in real time includes:
  detecting a length of the decoding buffer queue and/or a length of the rendering buffer queue in real time;
  detecting whether the data amount of the target audio and video data is larger than a first preset data amount includes:
  detecting whether the length of the decoding buffer queue being larger than a first preset length;
  detecting whether the data amount of the target video data is larger than a second preset data amount includes:
  detecting whether the length of the rendering buffer queue is larger than a second preset length.

In a second aspect, an embodiment of the present invention provides a data processing system, including a main thread in a Web client and a target sub-thread in the Web client.

The main thread is configured for obtaining audio and video data of a target video from a server; decapsulating the obtained audio and video data to obtain first audio and video data; sending the first audio and video data to the target sub-thread in the Web client; receiving second audio and video data sent by the target sub-thread; rendering video data in the second audio and video data by using a rendering module of a browser of the Web client, and taking the rendered video data and audio data in the second audio and video data as to-be-played data for the target video.

The target sub-thread is configured for receiving the first audio and video data sent by the main thread; decoding the first audio and video data to obtain second audio and video data, and sending the second audio and video data to the main thread.

In a third aspect, an embodiment of the present invention provides a data processing apparatus, applicable to a main thread in a Web client and including:
  an obtaining unit, a decapsulation unit, a first processing unit, a second processing unit and a third processing unit for implementing processing functions of the main thread in the Web client, and a decoding unit for implementing processing function of a target sub-thread in the Web client;
  wherein, the obtaining unit is configured for obtaining audio and video data of a target video from a server;
  the decapsulation unit is configured for decapsulating the obtained audio and video data to obtain first audio and video data;
  the first processing unit is configured for sending the first audio and video data to the target sub-thread in the Web client;
  the decoding unit is configured for decoding the first audio and video data to obtain second audio and video data and sending the second audio and video data to the main thread;
  the second processing unit is configured for receiving the second audio and video data sent by the target sub-thread; and
  the third processing unit is configured for rendering video data in the second audio and video data by using a rendering module of a browser of the Web client, and taking the rendered video data and audio data in the second audio and video data as to-be-played data for the target video.

Optionally, the Web client communicates with the server via WebSocket protocol; and the obtaining unit is further configured for:
  invoking a WebSocket callback function to obtain the audio and video data of the target video from the server.

Optionally the decapsulation unit is further configured for:
  decapsulating, by Javascript/WASM, the obtained audio and video data to obtain the first audio and video data.

Optionally the decoding unit is further configured for:
  decoding, by Javascript/WASM, the first audio and video data to obtain the second audio and video data.

Optionally the third processing unit is further configured for:
  invoking the rendering module of the browser of the Web client to render the video data in the second audio and video data;
  or,
  sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

Optionally, the apparatus further includes:
  a data amount detection unit, configured for detecting a data amount of target audio and video data and/or a data amount of a target video data in real time; wherein the target audio and video data is undecoded audio and video data in the first audio and video data received by the target sub-thread in the Web client; and the target video data is unrendered video data in the second audio and video data;
  a fourth processing unit, configured for, if the data amount of the target audio and video data is detected to be larger than a first preset data amount, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; and
  a fifth processing unit, configured for, if the data amount of the target video data is detected to be larger than a second preset data amount, sending a second instruction to the server; so that server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Optionally, the target audio and video data forms a decoding buffer queue, and the target video data forms a rendering buffer queue;
  the data amount detection unit is further configured for detecting a length of the decoding buffer queue and/or a length of the rendering buffer queue in real time;
  the fourth processing unit is further configured for, if the length of the decoding buffer queue is detected to be larger than a first preset length, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client;

the fifth processing unit is further configured for, if the length of the rendering buffer queue is detected to be larger than a second preset length, sending a second instruction to the server; so that server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

In a fourth aspect, an embodiment of the present invention provides an electronic device, including a processor, a communication interface, a memory and a communication bus, wherein the processor, the communication interface and the memory communicate with each other via the communication bus.

The memory is configured for storing a computer program.

The processor is configured for executing the computer program stored in the memory, so as to perform any of the method steps of the data processing method according to the first aspect.

In a fifth aspect, an embodiment of the present invention provides a data processing system, including: a Web client and a server connected in communication via WebSocket protocol.

The main thread in the Web client is configured for for obtaining audio and video data of a target video from the server; decapsulating the obtained audio and video data to obtain the first audio and video data; sending the first audio and video data to a target sub-thread in the Web client.

The target sub-thread in the Web client is configured for receiving the first audio and video data sent by the main thread in the Web client, decoding the first audio and video data to obtain second audio and video data, and sending the second audio and video data to the main thread.

The main thread in the Web client is further configured for receiving the second audio and video data sent by the target sub-thread; rendering the video data in the second audio and video data by using a rendering module of the browser of the Web client, and taking the rendered video data and the audio data in the second audio and video data as to-be-displayed data for the target video.

The server is configured for sending the audio and video data of the target video to the main thread in the Web client.

In a sixth aspect, an embodiment of the present invention provides a computer-readable storage medium, having a computer program stored thereon which, when executed by a processor, causes the processor to perform any of the method steps in the data processing method according to the first aspect.

In a seventh aspect, an embodiment of the present invention provides an application program, configured for configuring any of the method steps in the data processing method according to the first aspect at runtime.

The solution according to the embodiment of the present application is applicable to a main thread in a Web client. Specifically, the main thread in the Web client obtains audio and video data of a target video from the server; decapsulates the obtained audio and video data to obtain first audio and video data; and sends the first audio and video data to a target sub-thread in the Web client. The target sub-thread in the Web client receives the first audio and video data sent by the main thread in the Web client; decodes the first audio and video data to obtain the second audio and video data, and sends the second audio and video data to the main thread in the Web client. The main thread in the Web client receives the second audio and video data sent by the target sub-thread in the Web client; renders the video data in the second audio and video data by using a rendering module of the browser of the Web client, and takes the rendered video data and the audio data in the second audio and video data as to-be-displayed data for the target video. Therefore, the Web client according to the embodiment of this application can play audio and video data without browser plug-ins.

BRIEF DESCRIPTION OF THE DRAWINGS

In order to more clearly explain the technical solutions in the embodiments of this application or of the prior art, accompanying drawings that need to be used in embodiments and in the prior art will be briefly described below. Obviously, accompanying drawings described below are only some embodiments of the present application. For those skilled in the art, other drawings can be obtained according to these accompanying drawings without any creative efforts.

DETAILED DESCRIPTION

The technical solution in the embodiments of the present application will be clearly and completely described in combination with the drawings in the embodiment of the present application. Obviously, the described embodiments are only a part of the embodiments of the present application, not all the embodiments. Based on the embodiment of the present application, all other embodiments obtained by ordinary technical personnel in the art without creative work shall fall within the protection scope of the present application.

In order to solve the technical problem described in the background art, embodiments of the present application provide a method and a data processing apparatus, and an electronic device, a system, and a storage medium, to enable a Web client to play audio and video data without a browser plug-in.

It should be noted that the data processing method provided in the embodiments of the present application may be implemented by a main thread in a Web client running in an electronic device and communicating with a server via WebSocket protocol.

The data processing method and apparatus, and the electronic device, the system, and the storage medium provided in embodiments of the present application will be described in detail below.

In a first aspect, the data processing method provided in an embodiment of the present application is introduced.

Figure 1:
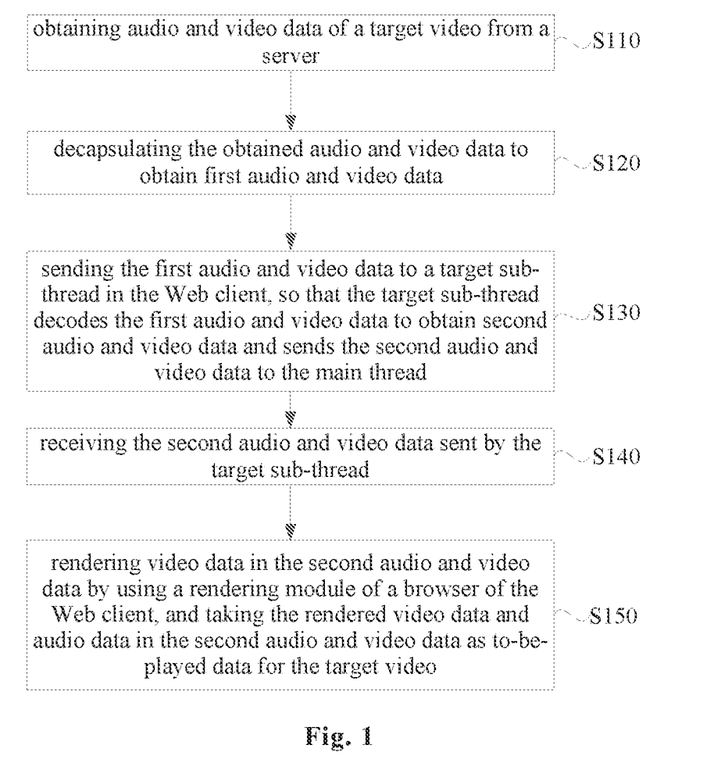
FIG. 1 is a flowchart of a data processing method according to an embodiment of the present application.

As shown in FIG. 1, a data processing method provided in an embodiment of the present application may include the following steps.

At S110, audio and video data of a target video is obtained from a server.

A large number of videos are stored in the server, any of which may be the above-mentioned target video. A target video may include a plurality of audio and video data, that is, audio and video data segments. The main thread in the Web client can continuously obtain audio and video data of target videos from the server.

The process of storing the audio and video data in the server may be, but not limited to: collecting audio and video data through an audio and video collector, and encoding and encapsulating the collected audio and video data, that is, obtaining the audio and video data to be sent to the main thread in the Web client.

It should be noted that the main thread in the Web client can obtain the audio and video data of the target video from the server in the following two ways:

In the first way, the server actively sends audio and video data to the main thread in the Web client. The Web client and the server are in communication connection via WebSocket protocol. The WebSocket protocol is a TCP-based network protocol enabling full-duplex communication between a Web client and a server. Therefore, the server can actively send the audio and video data to the main thread in the Web client. Further, the server may determine the rate for sending the audio and video data to the main thread in the Web client based on the frame rate and code rate of acquired audio and video data.

In the second way, the main thread in the Web client can obtain the audio and video data of the target video from the server by invoking a WebSocket callback function.

Of course, the embodiment of the present application are not limited as to the way in which the main thread in the Web client obtains the audio and video data of the target video from the server.

At S120, the obtained audio and video data is decapsulated to obtain first audio and video data.

Since the audio and video data obtained from the server by the main thread in the Web client is audio and video data encapsulated by the server, the main thread in the Web client has to decapsulate the audio and video data obtained from the server to obtain the decapsulated audio and video data, that is, the first audio and video data.

In one implementation, the main thread in the Web client can decapsulate the obtained audio and video data by Javascript/WASM to obtain the first audio and video data.

WASM is an abbreviation of WebAssembly, which may be executed in a sandboxed execution environment, and implemented in an existing JavaScript virtual machine. WebAssembly may be invoked by JavaScript and utilized in JavaScript context, so as decapsulate the obtained audio and video data.

At S130, the first audio and video data is sent to a target sub-thread in the Web client so that the target sub-thread decodes the first audio and video data to obtain second audio and video data, and sends the second audio and video data to the main thread in the Web client.

At S140, the second audio and video data sent by the target sub-thread is received.

It should be noted that a decoding thread for decoding the first audio and video data exists in the Web client, and in this embodiment, the decoding thread is referred to as a target sub-thread. The target sub-thread may be established when to-be-decoded audio and video data exists in the main thread of the Web client. The target sub-thread may also be a thread pre-established by the Web client.

After decoding the first audio and video data to obtain the second audio and video data, the target sub-thread in the Web client may send the obtained second audio and video data to the main thread in the Web client. In this way, the main thread in the Web client can receive the second audio and video data sent by the target sub-thread.

In one implementation, after receiving the first audio and video data, the target sub-thread in the Web client can decode the first audio and video data by Javascript/WASM to obtain the second audio and video data.

At S150, video data in the second audio and video data is rendered by using a rendering module of the browser of the Web client, and the rendered video data and the audio data in the second audio and video data are taken as to-be-played data for the target video.

In order to obtain the to-be-played data for the target video, the decoded video data, that is, the video data in the second audio and video data, is to be rendered. It will be appreciated that the to-be-played data may include: the rendered video data and the audio data in the second audio and video data.

The video data in the second audio and video data may be rendered by using the rendering module of the browser of the Web client.

It is known in the art that the audio data can be directly played without rendering, and therefore, the audio data in the second audio and video data may not be rendered in the present application.

In one implementation, the main thread in the Web client can directly invoke a rendering module of the browser in the Web client to render the video data in the second audio and video data.

The main thread in the Web client may take the rendered video data and the audio data in the second audio and video data as to-be-played data for the target video.

In another implementation, the main thread in the Web client can send the second audio and video data to a main thread of the browser of the Web client. The main thread of the browser renders the video data in the second audio and video data by using a rendering module of the client, and sends the rendered video data and the audio data in the second audio and video data to the main thread in the Web client. In this way, the main thread in the Web client can receive the rendered video data and the audio data in the second audio and video data sent by the main thread of the Web browser.

The main thread in the Web client can then take the received rendered video data and the audio data in the second audio and video data as the to-be-played data for the target video.

The rendering module of the browser of the Web client may be Web Graphics library (WebGL).

In one particular implementation, the main thread in the Web client directly invoking the rendering module of the browser in the Web client to render the video data in the second audio and video data may include:

the main thread in the Web client directly invoking WebGL of the browser in the Web client to render video data in the second audio and video data.

In another implementation, the main thread in the above-mentioned Web client sending the second audio and video data to the main thread of the browser of the Web client such that the main thread of the browser renders the video data in the second audio and video data by using the rendering module may include:

the main thread in the Web client sending the second audio and video data to the main thread of the browser of the Web client, such that the main thread of the browser of the Web client renders the video data in the second audio and video data via WebGL after receiving the second audio and video data.

WebGL is a 3D drawing protocol that can provide 3D accelerated rendering. In this way, the 3D scene and model in the present implementation can be more smoothly presented by the main thread of the browser.

Specifically, in this implementation, the process of rendering the video data in the second audio and video data via WebGL by the main thread of the browser may include: determining 2D coordinates of all the frame data of the video data in the second audio and video data on the display, and assigning color values to the 2D coordinates to render the video data in the second audio and video data. WebGL enables the browser to render video data without plug-ins.

The technical solution according to the embodiment of the application may be implemented by a main thread in the Web client. Specifically, the main thread in the Web client obtains audio and video data of a target video from a server; decapsulates the obtained audio and video data to obtain first audio and video data; sends the first audio and video data to a target sub-thread in the Web client so that the target sub-thread decodes the first audio and video data to obtain second audio and video data, and sends the second audio and video data to the main thread in the Web client; receives the second audio and video data sent by the target sub-thread; renders the video data in the second audio and video data by using a rendering module of the browser of the Web client, and takes the rendered video data and the audio data in the second audio and video data as to-be-displayed data for the target video. In this solution provided by the embodiment, the Web client can play the audio and video data without browser plug-ins.

Furthermore, in order to prevent the target sub-thread from being overloaded due to a large amount of undecoded audio and video data existing in the target sub-thread, the main thread in the Web client may detect in real time the data amount of the undecoded audio and video data in the target sub-thread, that is, the data amount of the target audio and video data.

Correspondingly, in either case when the main thread in the Web client can directly invoke the rendering module of the browser in the Web client to render the video data in the second audio and video data, in order to prevent the main thread in the Web client from overload due to a large amount of unrendered video data existing in the main thread in the Web client; or when the main thread in the Web client can send the second audio and video data to the main thread of the browser of the Web client, so that the main thread of the browser renders the video data in the second audio and video data by using the rendering module of the browser, in order to prevent the main thread of the browser of the Web client from overload due to a large amount of unrendered video data existing in the main thread of the browser of the Web client, the main thread in the Web client may detect in real time the data amount of unrendered video data in the second audio and video data, that is, the data amount of the target video data.

When the main thread in the Web client can send the second audio and video data to the main thread of the browser of the Web client, so that the main thread of the browser renders the video data in the second audio and video data by using the rendering module of a browser, the unrendered video data in the second audio and video data is unrendered video data in the second audio that has been received by the main thread of the browser of the Web client.

Based on this, in one implementation, the data processing method according to the present application may further including the following operations.

At operation 1: the data amount of the target audio and video data and/or the data amount of the target video data are detected in real time.

The target audio and video data is undecoded audio and video data in the first audio and video data received by the target sub-thread in the Web client; and the target video data is unrendered video data in the second audio and video data.

At operation 2, if the data amount of the target audio and video data is detected to be larger than a first preset data amount, a first instruction is sent to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client.

At operation 3, if the data amount of the target video data is detected to be larger than a second preset data amount, sending a second instruction to the server; so that server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

In this implementation, the main thread in the Web client may solely detect in real time the data amount of the target audio and video data, or the data amount of the target video data. Alternatively, the main thread may also simultaneously detect both the data amount of the target audio and video data and the data amount of the target video data in real time.

Furthermore, when the data amount of the target audio and video data is detected to be larger than the first preset data amount, the main thread in the Web client can reduce the data amount of the target audio and video data so as to reduce the load of the target sub-thread in the Web client in three ways.

In the first way, when the data amount of the target audio and video data is detected to be larger than the first preset data amount, the main thread in the Web client can send the first instruction to the server, so that the server reduces, upon receiving the first instruction, the rate for sending audio and video data to the main thread in the client.

In this first way, the main thread in the Web client can detect whether the data amount of the target audio and video data is larger than the first preset data amount. When the data amount of the target audio and video data is detected to be larger than the first preset data amount, the main thread in the Web client can send the first instruction to the server, where the first instruction is used to instruct the server to reduce the rate for sending the audio and video data to the main thread in the Web client. Specifically, the first instruction can carry the number of frames of audio and video data that is to be sent by the server to the main thread in the Web client per unit time, and after receiving the first instruction, the server can send audio and video data to the main thread in the Web client according to the number of frames of audio and video data carried in the first instruction.

In the second way, when the data amount of the target audio and video data is detected to be larger than the first preset data amount, before sending the first audio and video data to the target sub-thread in the Web client, the main thread in the Web client can perform frame extraction on the first audio and video data obtained by decapsulation, take the first audio and video data subject to frame extraction as to-be sent first audio and video data of the target sub-thread, and then send the to-be-sent first audio and video data to the target sub-thread in the Web client, that is, the first audio and video data subject to frame extraction is sent to the target sub-thread in the Web client.

In this second way, the main thread in the Web client can detect whether the data amount of the target audio and video data is larger than the first preset data amount. When the main thread in the Web client detects that the data amount of the target audio and video data is larger than the first preset data amount, it indicates that there is relatively much undecoded audio and video data exists in the target sub-thread in the Web client, that is, the target sub-thread in the Web client has a heavy load. In this case, the main thread in the Web client can perform frame extraction on the first audio and video data obtained by decapsulation, and send the first audio and video data after frame extraction to the target sub-thread in the Web client. Correspondingly, if the data amount of the target audio and video data in the Web client is not larger than the first preset data amount, it indicates that less undecoded audio and video data exists in the target sub-thread in the Web client, therefore the first audio and video data obtained by decapsulation can be directly sent to the target sub-thread in the Web client.

The main thread in the Web client can perform frame extraction on the first audio and video data obtained by decapsulation based on a preset frame extraction rule. The preset frame extraction rule may be set according to actual conditions. For example, the preset frame extraction rule may extract 1 frame every 5 frames, or 1 frame every 10 frames. Embodiments of the present application are not limited in this aspect.

In the third way, when the data amount of the target audio and video data is detected to be larger than the first preset data amount, the main thread in the Web client can adopt the first and the second ways at the same time to reduce the data amount of the target audio and video data from two aspects, so as to reduce the load of the target sub-thread in the Web client. That is, the main thread in the Web client sends the first instruction to the server, so that after the server receives the first instruction, the rate for sending the audio and video data to the main thread in the Web client by the server is reduced; at the same time, before sending the first audio and video data obtained by decapsulation to the target sub-thread in the Web client, the frame extraction is performed on the first audio and video data obtained by decapsulation, and the first audio and video data subject yo frame extraction is sent to the target sub-thread in the Web client.

In addition, when the data amount of the target audio and video data is detected to be larger than the second preset data amount, the main thread in the Web client can likewise reduce the data amount of the target audio and video data so as to reduce the load of the main program in the Web client or the load of the main program of the browser in the Web client in three ways.

In the first way, when detecting that the data amount of the target audio and video data is larger than the second preset data amount, the main thread in the Web client can send a second instruction to the server, so that the server reduces, upon receiving the second instruction, the rate for sending audio and video data to the main thread in the Web client.

In this first way, the main thread in the Web client can detect whether the data amount of the target audio and video data is larger than the second preset data amount. When the main thread in the Web client detects that the data amount of the target audio and video data is larger than the second preset data amount, the main thread in the Web client can send a second instruction to the server, where the second instruction is used to instruct the server to reduce the rate for sending audio and video data to the main thread in the Web client. Specifically, the second instruction can carry the number of frames of audio and video data that is to be sent by the server to the main thread in the Web client per unit time. After receiving the second instruction, the server can send audio and video data to the main program in the Web client according to the number of frames of audio and video data carried in the second instruction.

In the second way, when detecting that the data amount of the target audio and video data is larger than the first preset data amount, the main thread in the Web client can perform frame extraction on video data in the second audio and video data before the video data in the second audio and video data is rendered by the rendering module of the browser of the Web client. Then the video data in the second audio and video data subject to frame extraction is taken as to-be-rendered second audio and video data. The to-be-rendered second audio and video data is rendered by the rendering module of the browser of the Web client. That is, the rendering module of the browser of the Web client is configured for rendering the video data in the second audio and video data subject to frame extraction.

When the main thread in the Web client can send the second audio and video data to the main thread of the browser of the Web client, so that the main thread of the browser renders the video data in the second audio and video data by using the rendering module of browser, the second way can specifically include:

When the data amount of the target audio and video data is detected to be larger than the first preset data amount, frame extraction is performed on video data in the second audio and video data, and the video data subject to frame extraction and audio data in the second audio and video data is sent to the main thread of the browser of the Web client, so that the main thread of the browser renders the video data subject to frame extraction and audio data in the second audio and video data by using the rendering module.

In this second way, the main thread in the Web client can detect whether the data amount of the target video data is larger than the second preset data amount, and when the main thread in the Web client detects that the data amount of the target video data is larger than the second preset data amount, it indicates that relatively much unrendered video data exists in the main thread in the Web client or in the main thread of the browser of the Web client, that is, the load of the main thread in the Web client or in the main thread of the browser of the Web client is heavy. In this case, the main thread in the Web client can perform frame extraction on the video data in the second audio and video data. As such, the main thread in the Web client or the main thread of the browser of the Web client can render the video data subject to frame extraction. Correspondingly, if the data amount of the target video data is not larger than the second preset data amount, the main thread in the Web client can directly render the video data in the second video data, or can directly send the second audio and video data to the main thread of the browser of the Web client.

In the third way, when the data amount of the target video data is detected to be larger than the second preset data amount, the main thread in the Web client can adopt the first and the second ways at the same time to reduce the data amount of the target video data from two aspects, so as to reduce the load of the main thread in the Web client or the main thread of the browser of the Web client. That is, the main thread in the Web client can send the second instruction to the server, so that after the server receives the second instruction, the rate for sending the audio and video data to the main thread in the Web client is reduced by the server. At the same time, before rendering the video data in the second audio and video data, frame extraction is performed on the video data in the second audio and video data, and the video data subject to frame extraction in the second video data is rendered by using the rendering module of the browser of the Web client.

It should be noted that both the first preset data amount and the second preset data amount can be set according to specific situations, and are not specifically limited in the embodiment of the application. It will be appreciated that the first preset data amount may be the same as/or different from the second preset data amount, and the relationship between the first preset data amount and the second preset data amount is not specifically limited in the embodiment of the application.

It will be appreciated that, the target audio and video data and the target video data may both exist in the form of a queue in practice. Based on this, in one implementation, the target audio and video data can form a decoding buffer queue, and the target video data can form a rendering buffer queue.

Therefore, in this implementation, the operation of detecting the data amount of the target audio and video data and/or the data amount of the target video data in real time can specifically include:
  detecting the length of the decoding buffer queue and/or the length of the rendering buffer queue in real time.

Further, the operation of detecting whether the data amount of the target audio and video data is larger than the first preset data amount can specifically include:
  detecting whether the length of the decoding buffer queue being larger than a first preset length.

Furthermore, the operation of detecting whether the data amount of the target video data is larger than the second preset data amount can specifically include:
  detecting whether the length of the rendering buffer queue is larger than a second preset length.

Figure 2:
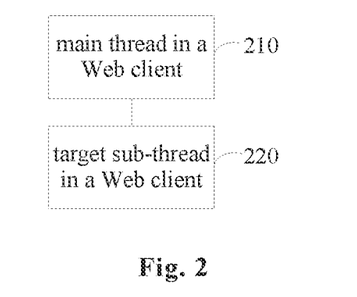
FIG. 2 is a schematic structural diagram of a system for data processing according to an embodiment of the present application.

In a second aspect, an embodiment of the present invention provides a data processing system, as shown in FIG. 2, the system includes a main thread 210 in a Web client and a target sub-thread 220 in the Web client.

The main thread is configured for obtaining audio and video data of a target video from a server; decapsulating the obtained audio and video data to obtain first audio and video data; sending the first audio and video data to the target sub-thread in the Web client; receiving second audio and video data sent by the target sub-thread; rendering video data in the second audio and video data by using a rendering module of a browser of the Web client, and taking the rendered video data and audio data in the second audio and video data as to-be-played data for the target video.

The target sub-thread is configured for receiving the first audio and video data sent by the main thread; decoding the first audio and video data to obtain second audio and video data, and sending the second audio and video data to the main thread.

In the solution according to the embodiment of this application, the main thread in the Web client obtains audio and video data of a target video from the server; decapsulates the obtained audio and video data to obtain first audio and video data; and sends the first audio and video data to a target sub-thread in the Web client. The target sub-thread in the Web client receives the first audio and video data sent by the main thread in the Web client; decodes the first audio and video data to obtain the second audio and video data, and sends the second audio and video data to the main thread in the Web client. The main thread in the Web client receives the second audio and video data sent by the target sub-thread in the Web client; renders the video data in the second audio and video data by using a rendering module of the browser of the Web client, and takes the rendered video data and the audio data in the second audio and video data as to-be-displayed data for the target video. Therefore, the Web client according to the embodiment of this application can play audio and video data without browser plug-ins.

Optionally, the main thread 210 in the Web client is specifically configured for: invoking a WebSocket callback function to obtain the audio and video data of the target video from the server Optionally, the main thread 210 in the Web client is specifically configured for: decapsulating, by Javascript/WASM, the obtained audio and video data to obtain the first audio and video data.

Optionally, the target sub-thread 220 in the Web client is specifically configured for: decoding, by Javascript/WASM, the first audio and video data to obtain the second audio and video data.

Optionally, the main thread 210 in the Web client is specifically configured for: invoking the rendering module of the browser of the Web client to render the video data in the second audio and video data;
  or,
  sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

Optionally, the main thread 210 in the Web client is further configured for:
  detecting a data amount of target audio and video data and/or a data amount of a target video data in real time; wherein the target audio and video data is undecoded audio and video data in the first audio and video data received by the target sub-thread in the Web client; and the target video data is unrendered video data in the second audio and video data; if the data amount of the target audio and video data is detected to be larger than a first preset data amount, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; if the data amount of the target video data is detected to be larger than a second preset data amount, sending a second instruction to the server; so that the server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Optionally, the target audio and video data forms a decoding buffer queue, and the target video data forms a rendering buffer queue.

the main thread 210 in the Web client is specifically configured for: detecting a length of the decoding buffer queue and/or a length of the rendering buffer queue in real time; if the length of the decoding buffer queue is detected to be larger than a first preset length, sending a first instruction to the server; so that the server reduces, upon the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; if the data amount of the target video data is detected to be larger than a second preset data amount, sending a second instruction to the server; so that server reduces, upon the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Figure 3:
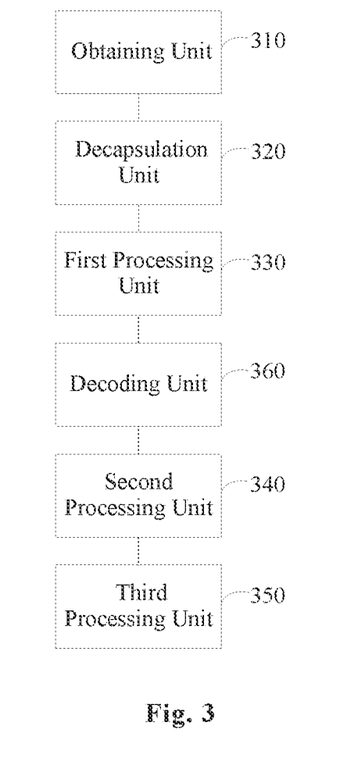
FIG. 3 is a schematic structural diagram of a data processing apparatus according to an embodiment of the present application.

In a third aspect, an embodiment of the present application further provides a data processing apparatus, applicable to a main thread in a Web client, wherein the Web client is communicatively connected to a server via WebSocket protocol. As shown in FIG. 3, the apparatus includes:

an obtaining unit 310, a decapsulation unit 320, a first processing unit 330, a second processing unit 340 and a third processing unit 350 for implementing processing functions of the main thread in the Web client, and a decoding unit 360 for implementing processing functions of the target sub-thread in the Web client.

The obtaining unit 310 is configured for obtaining audio and video data of a target video from a server.

The decapsulation unit 320 is configured for decapsulating the obtained audio and video data to obtain first audio and video data.

The first processing unit 330 is configured for sending the first audio and video data to the target sub-thread in the Web client.

The decoding unit 360 is configured for decoding the first audio and video data to obtain second audio and video data and sending the second audio and video data to the main thread.

The second processing unit 340 is configured for receiving the second audio and video data sent by the target sub-thread.

The third processing unit 350 is configured for rendering video data in the second audio and video data by using a rendering module of a browser of the Web client, and taking the rendered video data and audio data in the second audio and video data as to-be-played data for the target video.

The solution according to the embodiment of this application is applicable to a main thread in a web browser. The main thread in the Web client obtains audio and video data of a target video from the server; decapsulates the obtained audio and video data to obtain first audio and video data; and sends the first audio and video data to a target sub-thread in the Web client. The target sub-thread in the Web client receives the first audio and video data sent by the main thread in the Web client; decodes the first audio and video data to obtain the second audio and video data, and sends the second audio and video data to the main thread in the Web client. The main thread in the Web client receives the second audio and video data sent by the target sub-thread in the Web client; renders the video data in the second audio and video data by using a rendering module of the browser of the Web client, and takes the rendered video data and the audio data in the second audio and video data as to-be-displayed data for the target video. Therefore, the Web client according to the embodiment of this application can play audio and video data without browser plug-ins.

Optionally, the obtaining unit 310 is specifically configured for:

invoking a WebSocket callback function to obtain the audio and video data of the target video from the server.

Optionally, the decapsulation unit 320 is specifically configured for:

decapsulating, by Javascript/WASM, the obtained audio and video data to obtain the first audio and video data.

Optionally, the decoding unit 360 is specifically configured for:

decoding, by Javascript/WASM, the first audio and video data to obtain the second audio and video data.

Optionally, the third processing unit 350 is specifically configured for:

invoking the rendering module of the browser of the Web client to render the video data in the second audio and video data;

or, sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

Optionally, the apparatus further includes a data amount detection unit, configured for detecting a data amount of target audio and video data and/or a data amount of a target video data in real time; wherein the target audio and video data is undecoded audio and video data in the first audio and video data received by the target sub-thread in the Web client; and the target video data is unrendered video data in the second audio and video data;

a fourth processing unit, configured for, if the data amount of the target audio and video data is detected to be larger than a first preset data amount, sending a first instruction to the server; so that the server reduces, upon the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; and a fifth processing unit, configured for, if the data amount of the target video data is detected to be larger than a second preset data amount, sending a second instruction to the server; so that server reduces, upon the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Optionally, the target audio and video data forms a decoding buffer queue, and the target video data forms a rendering buffer queue.

The data amount detection unit is further configured for detecting a length of the decoding buffer queue and/or a length of the rendering buffer queue in real time.

The fourth processing unit is further configured for, if the length of the decoding buffer queue is detected to be larger than a first preset length, sending a first instruction to the server; so that the server reduces, upon the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client.

The fifth processing unit is further configured for, if the length of the rendering buffer queue is detected to be larger than a second preset length, sending a second instruction to the server; so that server reduces, upon the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Figure 4:
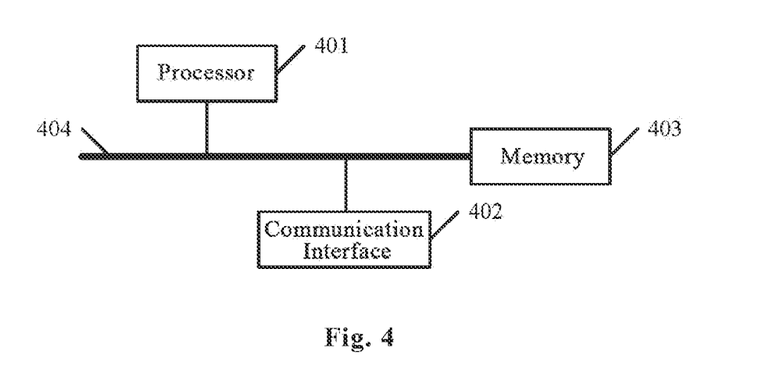
FIG. 4 is a schematic structural diagram of an electronic device according to an embodiment of the present application.

In a fourth aspect, an embodiment of the present invention provides an electronic device which, as shown in FIG. 4, includes a processor 401, a communication interface 402, a memory 403, and a communication bus 404, where the processor 401, the communication interface 402, and the memory 403 communicate with each other via the communication bus 404.

The memory 403 is configured for storing a computer program.

The processor 401 is configured for executing the computer program stored in the memory, so as to perform any of the steps of the data processing method according to the first aspect.

The communication bus in the above electronic device may be a Peripheral Component Interconnect (PCI) bus, an Extended Industry Standard Architecture (EISA) bus, and the like. The communication bus may include an address bus, a data bus, a control bus, etc. For ease of presentation, the communication bus is denoted by a thick line in the drawings. However, this does not mean that there is only one bus or one type of bus.

The communication interface is used for communication between the electronic device and other device.

The memory may be a Random Access Memory (RAM) or a Non-Volatile Memory (NVM), such as at least one disk memory. Alternatively, the memory may be at least one memory device remote from the processor.

The above processor may be a general-purpose Processor, including a Central Processing Unit (CPU), a Network Processor (NP), and the like; but also a Digital Signal Processors (DSP), an Application Specific Integrated Circuits (ASIC), a Field Programmable Gate Array (FPGA) or other Programmable logic devices, discrete Gate or transistor logic devices, discrete hardware components.

The solution according to the embodiment of this application is applicable to a main thread in a web browser. The main thread in the Web client obtains audio and video data of a target video from the server; decapsulates the obtained audio and video data to obtain first audio and video data; and sends the first audio and video data to a target sub-thread in the Web client. The target sub-thread in the Web client receives the first audio and video data sent by the main thread in the Web client; decodes the first audio and video data to obtain the second audio and video data, and sends the second audio and video data to the main thread in the Web client. The main thread in the Web client receives the second audio and video data sent by the target sub-thread in the Web client; renders the video data in the second audio and video data by using a rendering module of the browser of the Web client, and takes the rendered video data and the audio data in the second audio and video data as to-be-displayed data for the target video. Therefore, the Web client according to the embodiment of this application can play audio and video data without browser plug-ins.

Figure 5:
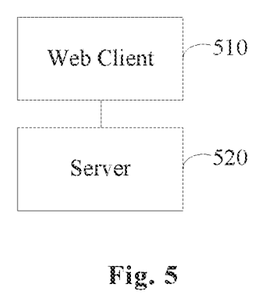
FIG. 5 is a schematic structural diagram of a system for data processing according to an embodiment of the present application.

In a fifth aspect, an embodiment of the present invention provides another data processing system which, as shown in FIG. 5, includes: a Web client 510 and a server 520. The Web client and the server are connected in communication via WebSocket protocol.

The main thread in the Web client 510 is configured for obtaining audio and video data of a target video from the server; decapsulating the obtained audio and video data to obtain the first audio and video data; sending the first audio and video data to a target sub-thread in the Web client.

The target sub-thread in the Web client 510 is configured for receiving the first audio and video data sent by the main thread in the Web client, decoding the first audio and video data to obtain second audio and video data, and sending the second audio and video data to the main thread.

The main thread in the Web client 510 is further configured for receiving the second audio and video data sent by the target sub-thread; rendering the video data in the second audio and video data by using a rendering module of the browser of the Web client, and taking the rendered video data and the audio data in the second audio and video data as to-be-displayed data for the target video.

The server 520 is configured for sending the audio and video data of the target video to the main thread in the Web client.

The solution according to the embodiment of this application is applicable to a main thread in a web browser. The main thread in the Web client obtains audio and video data of a target video from the server; decapsulates the obtained audio and video data to obtain first audio and video data; and sends the first audio and video data to a target sub-thread in the Web client. The target sub-thread in the Web client receives the first audio and video data sent by the main thread in the Web client; decodes the first audio and video data to obtain the second audio and video data, and sends the second audio and video data to the main thread in the Web client. The main thread in the Web client receives the second audio and video data sent by the target sub-thread in the Web client; renders the video data in the second audio and video data by using a rendering module of the browser of the Web client, and takes the rendered video data and the audio data in the second audio and video data as to-be-displayed data for the target video. Therefore, the Web client according to the embodiment of this application can play audio and video data without browser plug-ins.

Optionally, the main thread in the Web client 510 is specifically configured for:
invoking a WebSocket callback function to obtain the audio and video data of the target video from the server.

Optionally, the main thread in the Web client 510 is specifically configured for:
decapsulating, by Javascript/WASM, the obtained audio and video data to obtain the first audio and video data.

Optionally, the target sub-thread in the Web client 510 is specifically configured for:
decoding, by Javascript/WASM, the first audio and video data to obtain the second audio and video data.

Optionally, the main thread in the Web client 510 is specifically configured for:
invoking the rendering module of the browser of the Web client to render the video data in the second audio and video data;
or,
sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

Optionally, the main thread in the Web client 510 is further configured for: detecting a data amount of target audio and video data and/or a data amount of a target video data in real time; wherein the target audio and video data is undecoded audio and video data in the first audio and video data received by the target sub-thread in the Web client; and the target video data is unrendered video data in the second audio and video data; and if the data amount of the target audio and video data is detected to be larger than a first preset data amount, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; and if the data amount of the target video data is detected to be larger than a second preset data amount, sending a second instruction to the server; so that the server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

Optionally, the target audio and video data forms a decoding buffer queue, and the target video data forms a rendering buffer queue.

The main thread in the Web client 510 is specifically configured for: detecting a length of the decoding buffer queue and/or a length of the rendering buffer queue in real time; and if the length of the decoding buffer queue is detected to be larger than a first preset length, sending a first instruction to the server; so that the server reduces, upon the first instruction, the rate for sending audio and video data to the main thread in the client; and/or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client; and if the length of the rendering buffer queue is detected to be larger than a second preset length, sending a second instruction to the server; so that server reduces, upon the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

In a sixth aspect, an embodiment of the present application further provides a computer-readable storage medium, having a computer program stored thereon which, when executed by a processor, causes the processor to perform any of the method steps in the data processing method according to the first aspect.

In a seventh aspect, an embodiment of the present invention provides an application program, configured for performing any of the method steps in the data processing method according to the first aspect at runtime.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include" "comprise" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, as for the system embodiment, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

What is claimed is:

1. A data processing method, applicable to a main thread in a Web client and comprising:
    obtaining audio and video data of a target video from a server;
    decapsulating the obtained audio and video data to obtain first audio and video data;
    sending the first audio and video data to a target sub-thread in the Web client, so that the target sub-thread decodes the first audio and video data to obtain second audio and video data and sends the second audio and video data to the main thread;
    receiving the second audio and video data sent by the target sub-thread; and
    rendering video data in the second audio and video data by using a rendering module of a browser of the Web client, and taking the rendered video data and audio data in the second audio and video data as to-be-played data for the target video;
    wherein the method further comprises:
    detecting a data amount of target audio and video data; wherein the target audio and video data is undecoded audio and video data in the first audio and video data received by the target sub-thread in the Web client; in response to that the data amount of the target audio and video data is detected to be larger than a first preset data amount, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client;
    or
    detecting a data amount of a target video data; wherein the target video data is unrendered video data in the second audio and video data; in response to that the data amount of the target video data is detected to be larger than a second preset data amount, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

2. The method according to claim 1, wherein the web client communicates with the server via WebSocket protocol;
    obtaining audio and video data of a target video from a server comprises:
    invoking a WebSocket callback function to obtain the audio and video data of the target video from the server.

3. The method according to claim 1, wherein decapsulating the obtained audio and video data to obtain first audio and video data comprises:
    decapsulating, by Javascript/WASM, the obtained audio and video data to obtain the first audio and video data.

4. The method according to claim 1, wherein the target sub-thread decoding the first audio and video data to obtain second audio and video data comprises:
    the target sub-thread decoding, by Javascript/WASM, the first audio and video data to obtain the second audio and video data.

5. The method according to claim 1, wherein rendering video data in the second audio and video data by using a rendering module of a browser of the Web client comprises:
    invoking the rendering module of the browser of the Web client to render the video data in the second audio and video data;
    or,
    sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

6. The method according to claim 1, wherein the target audio and video data forms a decoding buffer queue, and the target video data forms a rendering buffer queue;
    detecting a data amount of target audio and video data and/or a data amount of target video data comprises:
    detecting a length of the decoding buffer queue and/or a length of the rendering buffer queue in real time;
    detecting whether the data amount of the target audio and video data is larger than a first preset data amount comprises:
    detecting whether the length of the decoding buffer queue being larger than a first preset length;
    detecting whether the data amount of the target video data is larger than a second preset data amount comprises:
    detecting whether the length of the rendering buffer queue is larger than a second preset length.

7. The method according to claim 1, wherein the method further comprises:
    detecting a data amount of target audio and video data; wherein the target audio and video data is undecoded audio and video data in the first audio and video data received by the target sub-thread in the Web client; in response to that the data amount of the target audio and video data is detected to be larger than a first preset data amount, sending a first instruction to the server; so that the server reduces, upon receiving the first instruction, the rate for sending audio and video data to the main thread in the client;

or detecting a data amount of a target video data; wherein the target video data is unrendered video data in the second audio and video data; in response to that the data amount of the target video data is detected to be larger than a second preset data amount, sending a second instruction to the server; so that server reduces, upon receiving the second instruction, the rate for sending audio and video data to the main thread in the client.

8. A data processing system, comprising a main thread in a Web client and a target sub-thread in the Web client;

the main thread is configured for obtaining audio and video data of a target video from a server;

decapsulating the obtained audio and video data to obtain first audio and video data; sending the first audio and video data to the target sub-thread in the Web client; receiving second audio and video data sent by the target sub-thread; rendering video data in the second audio and video data by using a rendering module of a browser of the Web client, and taking the rendered video data and audio data in the second audio and video data as to-be-played data for the target video;

wherein the main thread is configured for:

detecting a data amount of target audio and video data; wherein the target audio and video data is undecoded audio and video data in the first audio and video data received by the target sub-thread in the Web client; in response to that the data amount of the target audio and video data is detected to be larger than a first preset data amount, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client;

or detecting a data amount of a target video data; wherein the target video data is unrendered video data in the second audio and video data; in response to that the data amount of the target video data is detected to be larger than a second preset data amount, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client;

the target sub-thread is configured for receiving the first audio and video data sent by the main thread; decoding the first audio and video data to obtain second audio and video data, and sending the second audio and video data to the main thread.

9. The data processing system according to claim 8, wherein the main thread is further configured for:

detecting a data amount of target audio and video data; wherein the target audio and video data is undecoded audio and video data in the first audio and video data received by the target sub-thread in the Web client; in response to that the data amount of the target audio and video data is detected to be larger than a first preset data amount, sending a first instruction to the server; so that the server reduces, upon receiving the first instruction, the rate for sending audio and video data to the main thread in the client;

or detecting a data amount of a target video data; wherein the target video data is unrendered video data in the second audio and video data; in response to that the data amount of the target video data is detected to be larger than a second preset data amount, sending a second instruction to the server; so that server reduces, upon receiving the second instruction, the rate for sending audio and video data to the main thread in the client.

10. An apparatus for data processing, applicable to a main thread in a Web client and comprising:

an obtaining unit, a decapsulation unit, a first processing unit, a second processing unit and a third processing unit for implementing processing functions of the main thread in the Web client, and a decoding unit for implementing processing function of a target sub-thread in the Web client;

wherein, the obtaining unit is configured for obtaining audio and video data of a target video from a server;

the decapsulation unit is configured for decapsulating the obtained audio and video data to obtain first audio and video data;

the first processing unit is configured for sending the first audio and video data to the target sub-thread in the Web client;

the decoding unit is configured for decoding the first audio and video data to obtain second audio and video data and sending the second audio and video data to the main thread;

the second processing unit is configured for receiving the second audio and video data sent by the target sub-thread; and the third processing unit is configured for rendering video data in the second audio and video data by using a rendering module of a browser of the Web client, and taking the rendered video data and audio data in the second audio and video data as to-be-played data for the target video;

a data amount detection unit, configured for detecting a data amount of target audio and video data and/or a data amount of a target video data; wherein the target audio and video data is undecoded audio and video data in the first audio and video data received by the target sub-thread in the Web client; and the target video data is unrendered video data in the second audio and video data;

wherein the apparatus further comprises:

a fourth processing unit, configured for, in response to that the data amount of the target audio and video data is detected to be larger than a first preset data amount, or, before sending the first audio and video data to a target sub-thread in the Web client, performing frame extraction on the first audio and video data obtained by decapsulation to obtain first audio and video data that is to be sent to the target sub-thread, and then sending the to-be-sent first audio and video data to the target sub-thread in the Web client;

or a fifth processing unit, configured for, in response to that the data amount of the target video data is detected to be larger than a second preset data amount, before rendering video data in the second audio and video data by using the rendering module of the browser of the Web client, performing frame extraction on video data in the second audio and video data to obtain to-berendered video data in the second audio and video data, and then rendering the to-be-rendered video data in the second audio and video data by using a rendering module of a browser of the Web client.

11. The apparatus according to claim 10, wherein, the Web client communicates with the server via WebSocket protocol; and the obtaining unit is further configured for:
invoking a WebSocket callback function to obtain the audio and video data of the target video from the server.

12. The apparatus according to claim 10, wherein, the decapsulation unit is further configured for:
decapsulating, by Javascript/WASM, the obtained audio and video data to obtain the first audio and video data.

13. The apparatus according to claim 10, wherein, the decoding unit is further configured for:
decoding, by Javascript/WASM, the first audio and video data to obtain the second audio and video data.

14. The apparatus according to claim 10, wherein, the third processing unit is further configured for:
invoking the rendering module of the browser of the Web client to render the video data in the second audio and video data;
or,
sending the second audio and video data to a main thread of the browser of the Web client, so that the main thread of the browser renders the video data in the second audio and video data by using the rendering module of the browser and sends the rendered video data and the audio data in the second audio and video data to the main thread of the Web client; and receiving data sent by the main thread of the browser.

15. The apparatus according to claim 10, wherein, the target audio and video data forms a decoding buffer queue, and the target video data forms a rendering buffer queue;
the data amount detection unit is further configured for detecting a length of the decoding buffer queue and/or a length of the rendering buffer queue in real time;
the fourth processing unit is further configured for, if the length of the decoding buffer queue is detected to be larger than a first preset length, sending a first instruction to the server; so that the server reduces, upon receiving the first instruction, the rate for sending audio and video data to the main thread in the client; and/or, before sending the first audio and video data to a target sub-thread in the Web client, performing frame extraction on the first audio and video data obtained by decaptulation to obtain first audio and video data that is to be sent to the target sub-thread, and then sending the to-be-sent first audio and video data to the target sub-thread in the Web client;
the fifth processing unit is further configured for, if the length of the rendering buffer queue is detected to be larger than a second preset length, sending a second instruction to the server; so that server reduces, upon receiving the second instruction, the rate for sending audio and video data to the main thread in the client; and/or, before rendering video data in the second audio and video data by using the rendering module of the browser of the Web client, performing frame extraction on video data in the second audio and video data to obtain to-be-rendered video data in the second audio and video data, and then rendering the to-be-rendered video data in the second audio and video data by using a rendering module of a browser of the Web client.

16. The apparatus for data processing according to claim 10, wherein the fourth processing unit is further configured for:
in response to that the data amount of the target audio and video data is detected to be larger than a first preset data amount, sending a first instruction to the server; so that the server reduces, upon receiving the first instruction, the rate for sending audio and video data to the main thread in the client.

17. The apparatus for data processing according to claim 10, wherein the fifth processing unit is further configured for:
in response to that the data amount of the target video data is detected to be larger than a second preset data amount, sending a second instruction to the server; so that server reduces, upon receiving the second instruction, the rate for sending audio and video data to the main thread in the client.

18. An electronic device, comprising: a memory configured for storing a computer program; and
a processor configured for executing the computer program stored in the memory, so as to perform method steps of claim 1.

19. A non-transitory computer-readable storage medium, having a computer program stored thereon which, when executed by a processor, causes the processor to perform method steps of claim 1.

* * * * *